(12) United States Patent
Tsongas et al.

(10) Patent No.: US 8,559,030 B2
(45) Date of Patent: Oct. 15, 2013

(54) AUGMENTED REALITY SYSTEM AND METHOD FOR DEVICE MANAGEMENT AND SERVICE

(75) Inventors: Jason Tsongas, Rochester, NY (US); Matthew Scrafford, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 671 days.

(21) Appl. No.: 12/844,586

(22) Filed: Jul. 27, 2010

(65) Prior Publication Data

US 2012/0026530 A1    Feb. 2, 2012

(51) Int. Cl.
  *G06F 13/00*  (2006.01)
  *G06K 15/00*  (2006.01)
  *G06F 3/12*  (2006.01)

(52) U.S. Cl.
  USPC ......... 358/1.14; 358/1.15; 358/406; 358/504; 358/1.13; 710/15; 710/18; 710/19; 710/20; 710/26; 399/8; 399/9; 399/12; 399/13; 399/1

(58) Field of Classification Search
  USPC .......... 358/1.11–1.18, 1.1, 204, 1.9, 2.1, 504, 358/400–407; 399/8–37; 455/564; 348/180, 348/187, 207.1, 207.2, 211.3
  See application file for complete search history.

(56) References Cited

U.S. PATENT DOCUMENTS

| | | | |
|---|---|---|---|
| 6,842,175 B1 | 1/2005 | Schmalstieg et al. | 345/427 |
| 2003/0068045 A1* | 4/2003 | Foth | 380/270 |
| 2003/0114176 A1* | 6/2003 | Phillipps | 455/500 |
| 2004/0048571 A1* | 3/2004 | Kiyose | 455/41.2 |
| 2004/0189675 A1 | 9/2004 | Pretlove et al. | 345/633 |
| 2007/0024644 A1 | 2/2007 | Bailey | 345/633 |
| 2007/0097419 A1* | 5/2007 | Mathewson | 358/1.15 |
| 2009/0225172 A1* | 9/2009 | Tsuchiya | 348/207.1 |

* cited by examiner

*Primary Examiner* — Chad Dickerson
(74) *Attorney, Agent, or Firm* — Kermit D. Lopez; Luis M. Ortiz; Ortiz & Lopez, PLLC

(57) ABSTRACT

An augmented reality system and method for diagnosing and fixing a fault in a device. A mobile communication device can be operatively connected with a networked rendering device by reading a two-dimensional bar code associated with the rendering device. An image with respect to the rendering device can be captured by an image-capturing unit associated with the mobile communication device. The image can be augmented with additional information and a target area can be highlighted in order to indicate a fault component. An action to be taken with respect to the target area can be displayed on the mobile communication device. Such an approach permits an end user to address the device issue with increased quality of information and accuracy.

18 Claims, 6 Drawing Sheets

AUGMENTED REALITY SYSTEM AND METHOD FOR DEVICE MANAGEMENT AND SERVICE

TECHNICAL FIELD

Embodiments are generally related to rendering devices such as, for example, printers, scanners, photocopy machines, multi-function devices and the like. Embodiments are also related to augmented reality technology. Embodiments are additionally related to methods for diagnosing and fixing faults in a rendering device.

BACKGROUND OF THE INVENTION

Networked rendering devices can interact with an assemblage of other rendering devices, client devices, servers, and other components that are connected to and communicate over a network. One example of a rendering device is a MFD (Multi-Function Device), which includes the functionality of multiple rendering devices such as printers, scanners, faxes, copy machines, and so forth. Such networked rendering devices may be subjected to various faults such as, for example, a paper jam in a paper path, an empty toner housing and the like which impact system operation. Such fault condition may result in immediate shutdown of the rendering device, depending upon the severity of the fault. Diagnostic techniques are generally employed to fix the faults in more complex rendering devices, and to identify the cause of failure in a machine component from a failure symptom, as well as to predict the occurrence of a particular failure type from precursors.

The majority of prior art approaches for indicating the presence of rendering device faults to an operator are well known. In one prior art approach, for example, a graphical representation of the device can be displayed via a local user interface associated with the networked rendering device. The difficulty associated with such an approach is that the operator must view each set of detailed instructions to identify the affected areas in the rendering device. In another prior art approach, for example, the problems associated with the rendering device can be conveyed to a service personnel via a cryptic code. Such an approach can be labor intensive and requires skilled and trained agents to detect the problem associated with the code and is time-consuming and prone to error.

Based on the foregoing, it is believed that a need exist for an improved augmented reality system and method for diagnosing and fixing a fault in a device, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for configuring a networked rendering device, such as a printer, scanner, photocopy machine, fax machine, multi-function device (MFD) etc., or a combination thereof.

It is another aspect of the disclosed embodiment to provide for an improved method for diagnosing and fixing a fault in a device.

It is a further aspect of the disclosed embodiment to provide for an improved system and method for augmenting a rendering device component.

The aforementioned aspects and other objectives and advantages can now be achieved as described herein. An augmented reality system and method for diagnosing and fixing a fault in a device is disclosed herein. A mobile communication device can be operatively connected with a networked rendering device by reading a two-dimensional barcode (e.g., quick response code) associated with the rendering device. An image with respect to the rendering device can be captured by an image-capturing unit associated with the mobile communication device. The image can be augmented with additional information and a target area can be highlighted in order to indicate a fault component. An action to be taken with respect to the target area can be displayed on the mobile communication device. Such an approach permits an end user to address the device issue with increased quality of information and accuracy.

The two-dimensional barcode can be attached as a hard copy image with respect to the rendering device and/or displayed on a user interface associated with the rendering device. The two-dimensional barcode can be scanned via the image-capturing unit associated with the mobile communication device for establishing a connection with the rendering device. The IP (Internet Protocol) address of the device can also be entered on the mobile communication device to initiate a connection in order to implement a security layer. Once the connection is established, a request can be initiated on the mobile communication device to position the image-capturing unit with respect to the rendering device. Parts of the device that are affected by the fault can be highlighted in a designated manner, for example via icons or color, etc. The augmented information includes location of a fault associated with the rendering device, doors/panels to be removed in order to gain access to the fault, supplies (e.g. toners) in need of replacement and the action required on the user interface of the device. Such an approach reduces time required to address the device faults through increased quality of the information provided and reduces onsite time and frequency needed by a service personnel.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
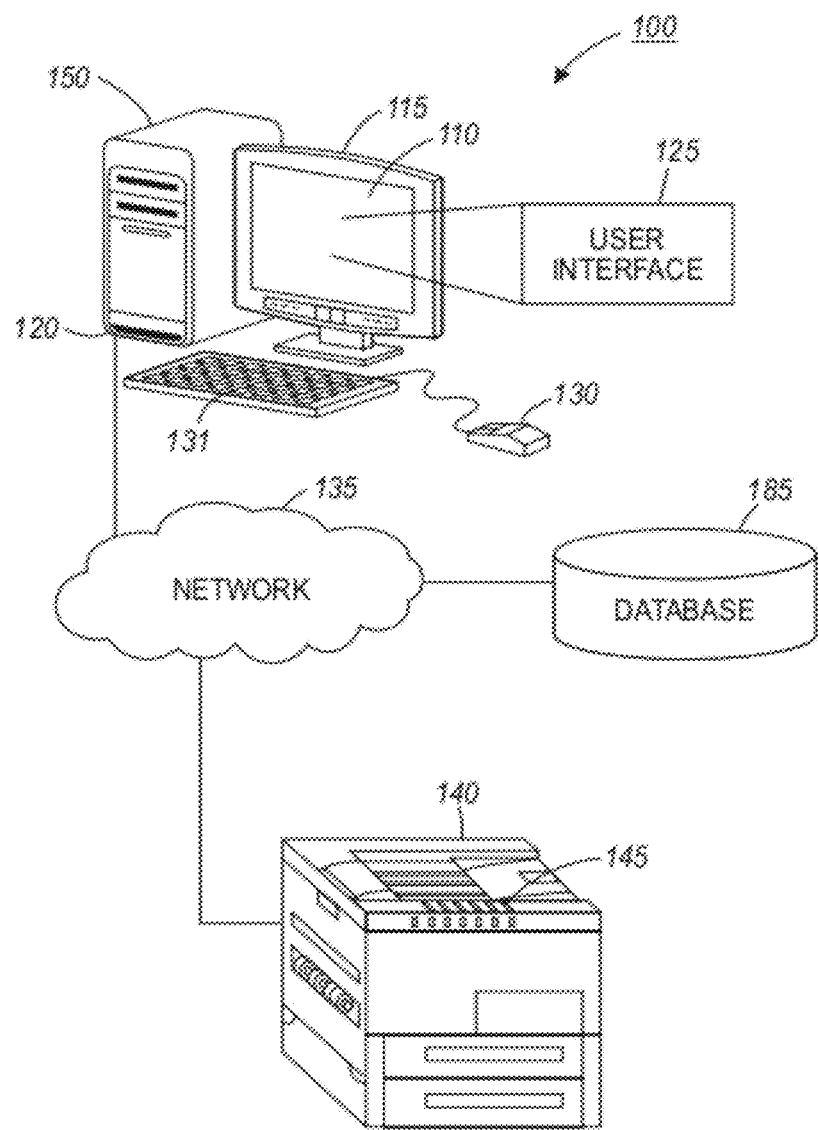
FIG. 1 illustrates an example of a rendering device coupled to a data-processing apparatus through a network, in accordance with the disclosed embodiments.

Referring to FIG. 1, system 100 includes a rendering device 140 coupled to a data-processing apparatus 110 through a network 135. In some embodiments, rendering device 140 may be a rendering device such as a printer, scanner, copy machine, etc. In other embodiments, rendering device 140 may be an MFD. The data-processing apparatus 110 may be, for example, a personal computer or other computing device, and generally includes a central processor 120, a display device 115, a keyboard 131, and a pointing device 130 (e.g., mouse, track ball, pen device, or the like). Additional input/output devices, such as the rendering device 140 may be included in association with the data-processing apparatus 110 as desired.

Figure 2:
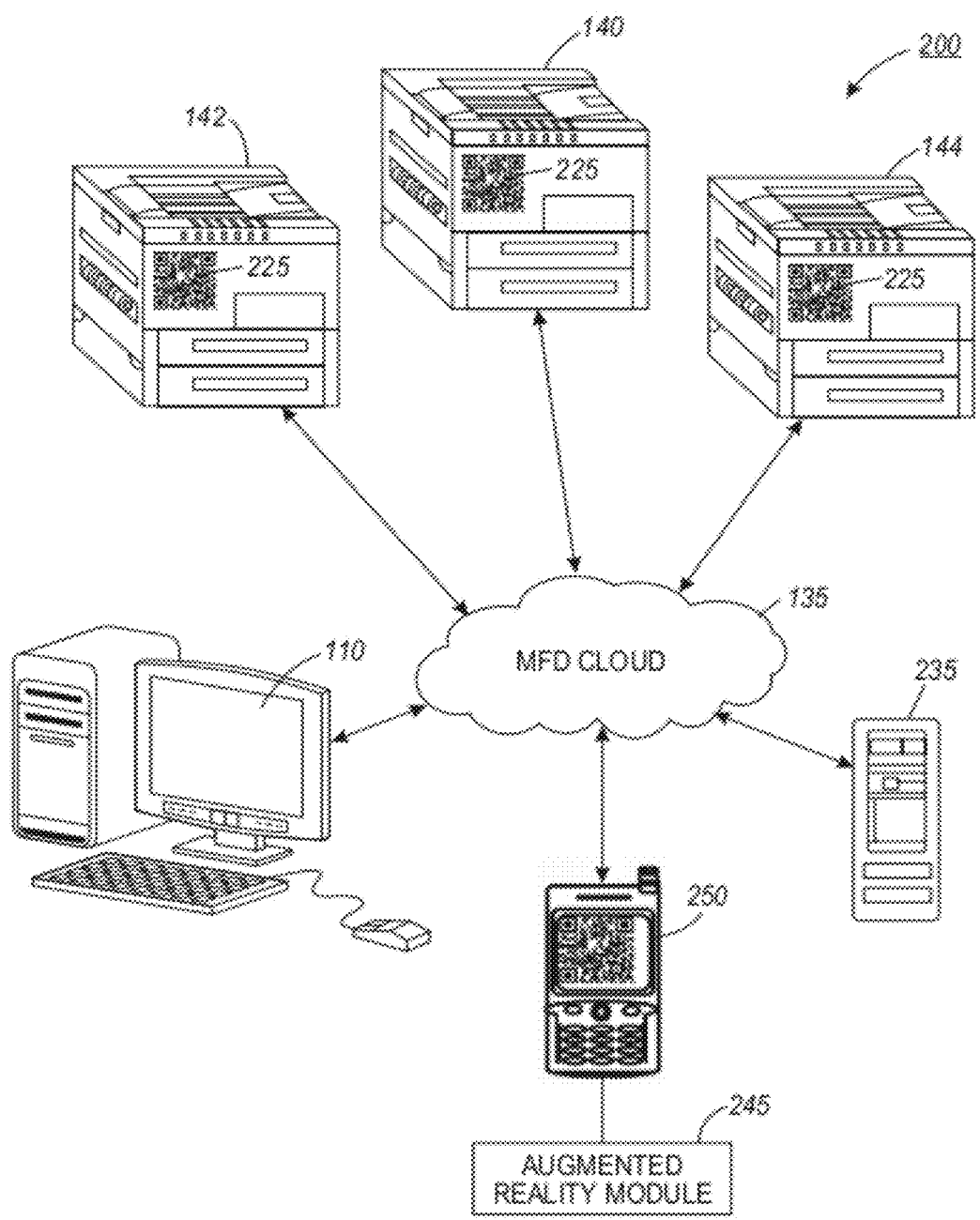
FIG. 2 illustrates a graphical representation of an augmented reality system associated with a network, in accordance with the disclosed embodiments.

Note that as utilized herein, the term rendering device may refer to an apparatus or system such as a printer, scanner, fax machine, copy machine, etc., and/or a combination thereof (e.g., an MFD). Preferably, rendering device 140 is an MFD capable of multiple rendering functions such as printing, copying, scanning, faxing, etc. In some embodiments, the rendering device 140 may be implemented with a single rendering function such as printing. In other embodiments, the rendering device 140 can be configured to provide multiple rendering functions, such as scanning, faxing, printing and copying. Note that the rendering devices 142 and 144 illustrated herein with respect to FIG. 2 are generally analogous or similar to rendering device 140.

A non-limiting example of an MFD that can be utilized as rendering devices 140, 142 and/or 144 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of an MFD that can be utilized as rendering devices 140, 142 and/or 144 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of an MFD that can be utilized as rendering devices 140, 142 and/or 144 is disclosed in U.S. Pat. No. 5,920,405, entitled "Multifunction Device With Printer Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn.

The data-processing apparatus 110 can be coupled to the rendering device 140 (and other rendering devices) through a computer network 135. Network 135 may employ any network topology, transmission medium, or network protocol. The network 135 may include connections, such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The rendering device 140 includes a user interface 145, such as a panel menu. The panel menu may be used to select features and enter other data in the rendering device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a print job with the driver for processing by the rendering device 140.

The data-processing apparatus 110 also includes a GUI 125 for communicating rendering features for processing, for example, a print job to a user and accepting the user's selection of available rendering features. The user interface 125 displays information and receives data through device display and/or the keyboard/mouse combination. The interface 125, also serves to display results, whereupon the user may supply additional inputs or terminate a given session. The data-processing apparatus 110 can be, for example, any computing device capable of being integrated within a network, such as a PDA, personal computer, cellular telephone, point-of-sale terminal, server, etc.

Note that the user interface as utilized herein generally refers to a type of environment that represents programs, files, options and so forth by means of graphically displayed icons, menus, and dialog boxes on a screen. The input device of the rendering device 140, for example, may be a local user interface 125, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the present invention, which can be embodied in the context of a data-processing apparatus 110 and rendering device 140 depicted in FIG. 1. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

FIG. 2 illustrates a graphical representation of an augmented reality system 200 associated with a network 135, in accordance with the disclosed embodiments. The augmented reality system 200 generally includes a network infrastructure 135 associated with one or more networked rendering devices 140, 142 and 144, data-processing system 110, a mobile communication device 250 and a server 235. Data-processing system 110 depicted in FIG. 1 can be, for example, a server. Other devices such as, for example, desktops, network devices, palmtops, mobile phones, etc may also be included in the network 135, as service providers. The rendering devices 140, 142 and 144 can be located remotely with respect to each other, or alternatively, they may be located locally with respect to each other.

The rendering device is an office machine which incorporates the functionality of multiple devices in one, so as to provide centralized document management, document distribution and production in a large-office setting and the like. The typical rendering device may act as a combination of a printer, scanner, photocopier, fax and e-mail. While two rendering devices 140, 142 and 144 are shown by way of example, it is to be appreciated that any number of rendering devices may be linked to the network, such as three, four, six or more rendering devices. In general, the rendering devices 140, 142 and 144 can be employed to perform a rendering output function (e.g., printing, scanning, copying, faxing, etc) within a networked environment. Note that rendering devices 140, 142 and 144 are generally analogous to one another.

The rendering device 140, 142 and 144 can be configured in association with a two-dimensional bar code 225 that includes information (e.g. address details, service information etc.,) with respect to the rendering device 140, 142 and 144. An augmented reality module 245 associated with the mobile communication device 250 can be adapted for diagnosing and fixing a fault associated with the networked rendering device 140, 142 and 144. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as USB drives, Flash drives, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

Figure 3:
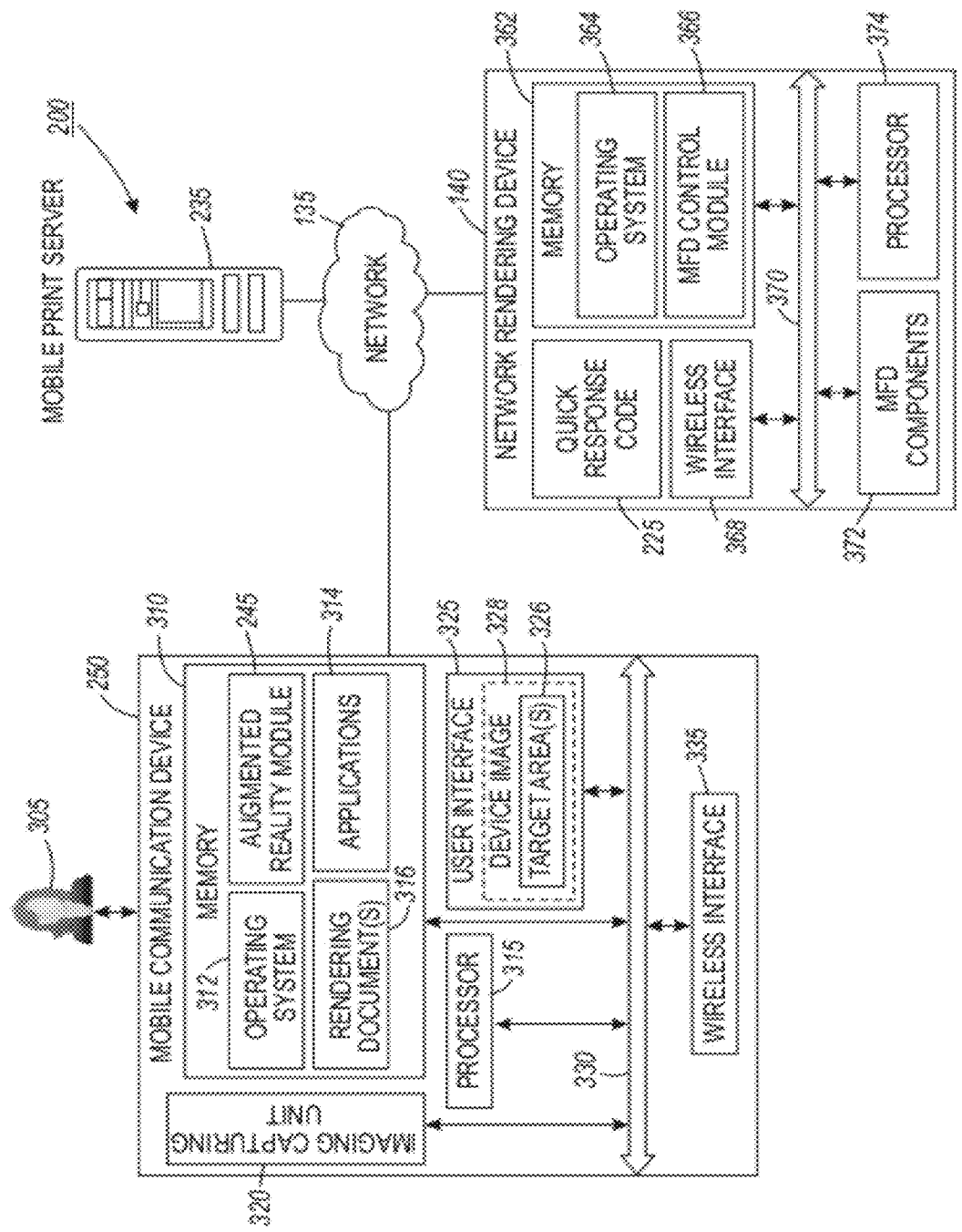
FIG. 3 illustrates a block diagram of the augmented reality system for diagnosing and fixing a fault in a device, in accordance with the disclosed embodiments.

FIG. 3 illustrates a block diagram of the augmented reality system 200 for diagnosing and fixing faults in the rendering device 140, in accordance with the disclosed embodiments. Note that in FIGS. 1-7, identical or similar blocks are generally indicated by identical reference numerals. The augmented reality system 200 generally includes the mobile communication device 250, the networked rendering device 140, and a mobile printer server 235 that are operatively configured in association with the network 135. The system 200 can be employed for diagnosing and fixing faults in the rendering device 140 by displaying an image that is augmented with additional information and a target area to be diagnosed at the mobile communication device 250. In general, the augmented reality is a term for a live direct or indirect view of a physical real-world environment whose elements are augmented by virtual computer-generated imagery. Artificial information regarding the environment and the objects in it can be stored and retrieved as an information layer on top of the real worldview.

Augmented reality, which is the term derived from terminology regarding virtual environment and virtual reality, is a field of computer research which deals with the combination of real-world images and virtual-world images such as computer graphic images. Real world information may include information that is not necessarily needed by users or lack information that is needed by users. In a virtual environment created by a computer, such unnecessary information can be simplified or can be made invisible. In other words, augmented reality systems combine a real environment with virtual objects, thereby effectively interacting with users in real time.

The mobile communication device 250 can be such as, for example, a Smartphone, a personal digital assistant (PDA), and the like. The mobile communication device 250 includes an image capturing unit 320, a memory 310, a processor 315 and the user interface 325 coupled to a local interface 330. The image-capturing unit 320 may be generally employed to capture optical images such as pages of documents, handwritten messages, hand-sketched drawings and other type of image related information. The image-capturing unit 320 may include built-in integrated functions such as image processing, data formatting and data compression functions. Also, the unit 320 includes imager-positioning and range-finding capabilities and a flash bulb. The local interface 330 can be for example, a data bus with an accompanying control/address bus.

A wireless interface 335 facilitates wireless communication with the networked rendering device 140 and other wireless devices and/or networks. The memory 310 stores several components that are executable by the processor 315. The components include, for example, an operating system 312, one or more applications 314, one or more rendering documents 316 and the augmented reality module 245. The augmented reality module 245 can be configured for diagnosing and fixing the fault associated with the networked rendering device 140.

The networked rendering device 140 includes a processor circuit having a memory 362 and a processor 374 coupled to a local interface 370. The memory 362 stores an operating system 364 and a print control module 366 that are executable by the processor 374. The networked rendering device 140 also includes various printer components 372 such as motors and mechanical paper path components as well as image creation components. A wireless network interface 368 coupled to the local interface 370 facilitates wireless communication in the networked rendering device 140. The two-dimensional barcode 225 associated with the networked rendering device 140 can be attached as a hard copy image or displayed on a user interface of the rendering device 140.

The two-dimensional barcode 225 can be for example, a quick response (QR) code, depending upon design considerations. Note that the two-dimensional code 225 can be a machine-readable code utilizing either a public standard encoding symbol or a proprietary symbol. The two-dimensional code 225 generally includes varying positioning symbols, apex detecting cells, information recording regions, timing cell regions and format code regions. The two-dimensional code 225 includes address information, blog/website information, email address, service information or any other normal text with respect to the networked rendering device 140. Such information can be encoded and stored as numeric, alphanumeric, binary (8 bits) (or) Kanji/full-width Kana characters.

The mobile communication device 250 can be operatively connected with the networked rendering device 140 by reading the two-dimensional bar code 225 associated with the rendering device 140 via the image capturing unit 320. The IP (Internet Protocol) address of the rendering device 140 can also be entered on the mobile communication device 250 to initiate a connection in order to implement a security layer. An image 328 with respect to the rendering device 140 can be captured by the image-capturing unit 320 associated with the mobile communication device 250. The image 328 can be augmented with additional information and a target area 326 can be highlighted in order to indicate a fault component. An action to be taken with respect to the target area 326 can be displayed on the mobile communication device 250. The system 200 provides increased customer satisfaction through the analysis of video and improvements brought about by the video.

Figure 4:
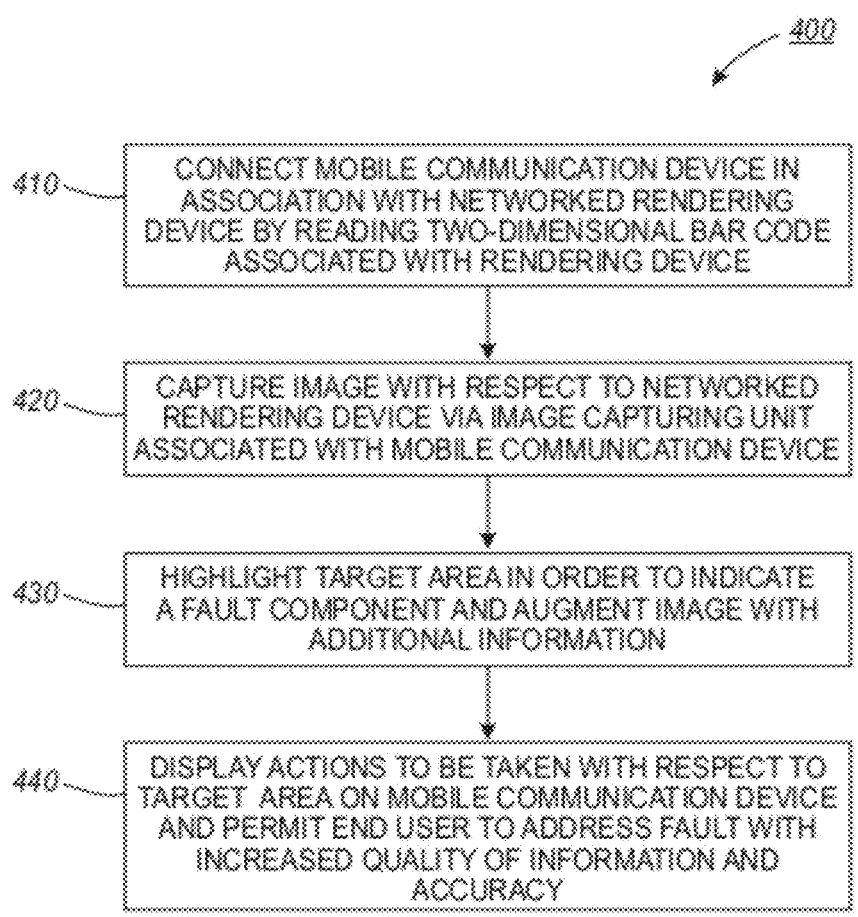
FIG. 4 illustrates a high level flow chart of operation illustrating logical operational steps of a method for diagnosing and fixing the fault in the device based on augmented reality, in accordance with the disclosed embodiments.

FIG. 4 illustrates a high level flow chart of operation illustrating logical operational steps of a method 400 for diagnosing and fixing a fault in the device 140 based on augmented reality, in accordance with the disclosed embodiment. Note that the method 400 can be implemented in the context of a computer-useable medium that contains a program product, including, for example, a module or group of modules. The mobile communication device 250 can be connected in association with the networked rendering device 140 by reading the two-dimensional bar code 225 associated with the rendering device 140, as illustrated at block 410. The image 328 with respect to the networked rendering device 140 can be captured via the image capturing unit 320 associated with the mobile communication device 250, as depicted at block 420. The target area 326 can be highlighted to indicate a fault component and the image 328 can be augmented with additional information, as indicated at block 430. The actions with respect to the target area 326 can be displayed on the mobile communication device 250, as illustrated at block 440. Such an approach permits an end user to address the device issue with increased quality of information and accuracy.

Note that programs defining functions with respect to the disclosed embodiments may be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including, for example, Ethernet, the Internet, wireless networks, other networked systems. Thus, the method 400 described herein can be deployed as process software in the context of a computer system or data-processing system as that depicted in FIGS. 1-2.

Figure 5:
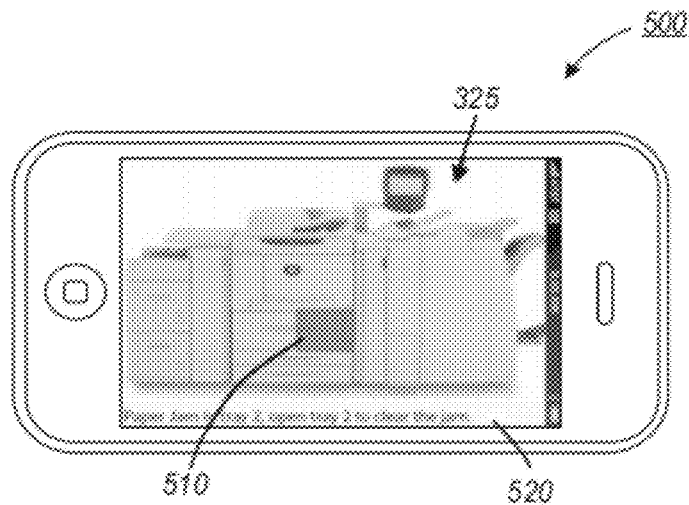
FIGS. 5-7 illustrate a user interface of a mobile communication device that displays a rendering device augmented
Figure 6:
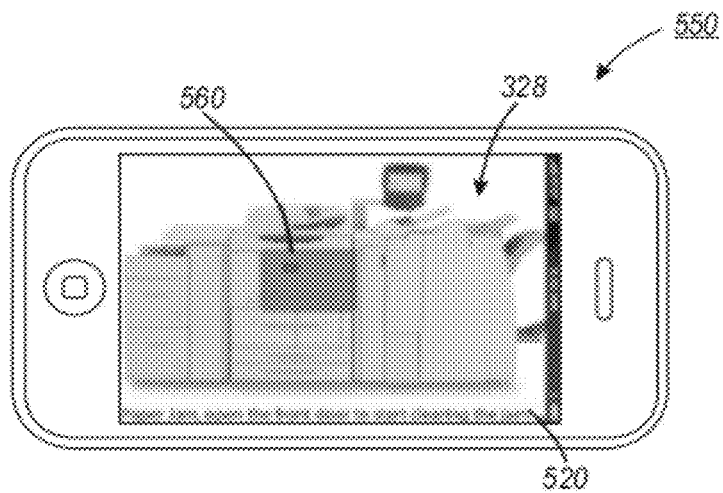
Figure 7:
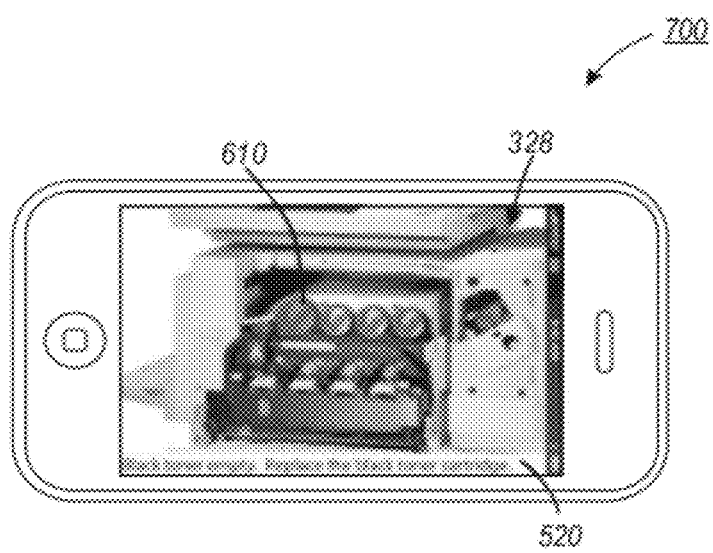

FIGS. 5-7 illustrate a user interface 500, 550 and 600 of the mobile communication device 250 that displays the rendering device image 328 augmented with additional information and the highlighted target area 326 that is to be diagnosed, in accordance with the disclosed embodiments. Note that the GUI 500, 550 and/or 600 can be implemented utilizing a GUI such as, for example, the GUI 125 depicted in FIG. 1 herein, and may be provided by a module, such as, for example, module 245 (i.e., a software application). GUI 500, 550 and/or 600 can be displayed via a display device such as monitor 115 depicted in FIG. 1. In the illustrated figures herein, 500, 550 and/or 600 are generally implemented in the context of a GUI "window". Note that in computing, a GUI window is generally a visual area containing some type of user interface (e.g., GUI 125). Such a "window" usually (but not always) possesses a rectangular shape, and displays the output of and may allow input to one or more processes. Such windows are primarily associated with graphical displays, where they can be manipulated with a mouse cursor, such as, for example, the pointing device 130 depicted in FIG. 1. A GUI using windows as one of its main "metaphors" is often referred to as a windowing system.

The augmented information 326 provided by the augmented reality system 200 generally includes details such as location of a fault/condition, doors/panels to be removed/opened to gain access to the fault/condition, supplies in need of replacement (e.g. toners), and actions required on the local UI of the device. The user interface 500 displays the rendering device image 328 with a target area 510 that displays a paper jam. The image 328 can be augmented with information from the device 140 of further action to be taken and highlights the target area 510. The actions (e.g., Jam in tray 2, open tray 2 to clear the jam) required to fix the faults can be displayed in the bottom region 520.

The user interface 550 displays the rendering device image 328 with a target area 560 that displays a paper jam. The image 328 can be augmented with information from the device 140 of further action to be taken and highlights the target area 560. The actions (e.g., paper jam, open the front door to start clearing the jam) required to fix the faults can be displayed in the bottom region 520. The user interface 550 displays the rendering device image 328 with a target area 610 that displays an empty toner condition. The image 328 can be augmented with information from the device 140 of further action to be taken and highlights the target area 610. The actions (e.g., black toner empty, replace the black toner cartridge) required to fix the faults can be displayed in the bottom region 520. Such an approach reduces time required to address the device faults through increased quality of the information provided and reduces onsite time and frequency needed by a service personnel.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for diagnosing a fault in a device, comprising:
operatively connecting a mobile communication device with a networked rendering device by said mobile communication device scanning a two-dimensional quick response code associated with said networked rendering device, wherein said mobile communication device comprises at least one of a smartphone, a PDA, and a tablet;
acquiring fault information for said networked rendering device on said mobile communication device when scanning said two-dimensional quick response code and capturing an image of said networked rendering device by an image capturing unit associated with said mobile communication device;

combining said captured image of said networked rendering device with augmented reality information related to said networked rendering device, wherein combing said captured image of said networked rendering device with augmented reality information comprises a peripheral view of the networked rendering device and said mobile communication device highlighting a target area of fault information of said networked rendering device to visually indicate a fault component on said networked rendering device shown on a display of said mobile communication device; and displaying an action on said mobile communication device to be taken with respect to said highlighted target area of fault information of said networked rendering device addressing said fault component of said networked rendering device, which provides a highlighted solution to said fault information of said networked rendering device, and the action is concurrently shown with the combined captured image of said networked rendering device with augmented reality information related to said networked rendering device on the display of the mobile communication device.

2. The method of claim 1 further comprising displaying said two-dimensional quick response code on a user interface associated with said networked rendering device.

3. The method of claim 1 further comprising attaching said two-dimensional quick response code in association with said networked rendering device as a hard copy image.

4. The method of claim 1 further comprising entering an IP address with respect to said network rendering device on said mobile communication device to initiate a connection in order to implement a security layer.

5. The method of claim 1 further comprising initiating a request to position said mobile communication device with respect to said networked rendering device.

6. The method of claim 1 wherein said augmented reality information comprises at least one of the following types of information:
   fault location information;
   access details;
   a supply in need of replacement; and
   a replacement action.

7. A system for diagnosing a fault in a device, said system comprising:
   a processor;
   a data bus coupled to said processor; and
   a non-transitory computer-usable medium embodying computer program code, said non-transitory computer-usable medium being coupled to said data bus, said computer program code comprising instructions executable by said processor and configured for:
   operatively connecting a mobile communication device with a networked rendering device by said mobile communication device scanning a two-dimensional quick response code associated with said networked rendering device, wherein said mobile communication device comprises at least one of a smartphone, a PDA, and a tablet;
   acquiring fault information for said networked rendering device on said mobile communication device when scanning said two-dimensional quick response code and capturing an image of said networked rendering device by an image capturing unit associated with said mobile communication device;

combining said captured image of said networked rendering device with augmented reality information related to said networked rendering device, wherein combining said captured image of said networked rendering device with said augmented reality information related to said networked rendering device comprises a peripheral view of the networked rendering device and said mobile communication device highlighting a target area of fault information of said networked rendering device to visually indicate a fault component on said networked rendering device shown on a display of said mobile communication device; and displaying an action on said mobile communication device to be taken with respect to said highlighted target area of fault information of said networked rendering device addressing said fault component of said networked rendering device, which provides a highlighted solution to said fault information of said networked rendering device, and the action is concurrently shown with the combined captured image of said networked rendering device with augmented reality information related to said networked rendering device on the display of the mobile communication device.

8. The system of claim 7 wherein said instructions are further configured for displaying said two-dimensional quick response code via a user interface associated with said networked rendering device.

9. The system of claim 7 wherein said instructions are further configured for attaching said two-dimensional quick response code in association with said networked rendering device as a hard copy image.

10. The system of claim 7 wherein said instructions are further configured for entering an IP address with respect to said networked rendering device on said mobile communication device to initiate a connection in order to implement a security layer.

11. The system of claim 7 wherein said instructions are further configured for initiating a request to position said mobile communication device with respect to said networked rendering device.

12. The system of claim 7 wherein said augmented reality information comprises at least one of the following types of information:
   fault location information;
   access details;
   a supply in need of replacement; and
   a replacement action.

13. A non-transitory computer-usable medium embodying computer program code for diagnosing a fault in a device, said computer program code comprising computer executable instructions configured for:
   operatively connecting a mobile communication device with a networked rendering device by said mobile communication device scanning a two-dimensional quick response code associated with said networked rendering device, wherein said mobile communication device comprises at least one of a smartphone, a PDA, and a tablet;
   acquiring fault information for said networked rendering device on said mobile communication device when scanning said two-dimensional quick response code and capturing an image of said networked rendering device by an image capturing unit associated with said mobile communication device;

combining said captured image of said networked rendering device with augmented reality information related to said networked rendering device,
wherein combining said captured image of said networked rendering device with said augmented reality information related to said networked rendering device comprises a peripheral view of the networked rendering device and said mobile communication device highlighting a target area of fault information of said networked rendering device to visually indicate a fault component on said networked rendering device shown on a display of said mobile communication device; and
displaying an action on said mobile communication device to be taken with respect to said target area of fault information of said networked rendering device addressing said fault component of said networked rendering device, which provides a physically highlighted solution to said fault information of said networked rendering device, and
the action is concurrently shown with the combined captured image of said networked rendering device with augmented reality information related to said networked rendering device on the display of the mobile communication device.

14. The computer-usable medium of claim 13 wherein said embodied computer program code further comprises computer executable instructions configured for displaying said two-dimensional quick response code on a user interface associated with said networked rendering device.

15. The computer-usable medium of claim 13 wherein said embodied computer program code further comprises computer executable instructions configured for attaching said two-dimensional quick response code in association with said networked rendering device as a hard copy image.

16. The computer-usable medium of claim 13 wherein said embodied computer program code further comprises computer executable instructions configured for entering an IP address with respect to said networked rendering device on said mobile communication device to initiate a connection in order to implement a security layer.

17. The computer-usable medium of claim 13 wherein said embodied computer program code further comprises computer executable instructions configured for initiating a request to position said mobile communication device with respect to said networked rendering device.

18. The computer-usable medium of claim 13 wherein said augmented reality information comprises at least one of the following types of information:
fault location information;
access details;
a supply in need of replacement; and
a replacement action.

* * * * *